United States Patent
Maeyama et al.

(10) Patent No.: US 11,442,181 B2
(45) Date of Patent: Sep. 13, 2022

(54) GEL FORMING COMPOSITION FOR RADIATION DOSIMETRY AND RADIATION DOSIMETER USING GEL THAT IS FORMED FROM SAID COMPOSITION

(71) Applicants: RIKEN, Wako (JP); NISSAN CHEMICAL CORPORATION, Tokyo (JP)

(72) Inventors: Takuya Maeyama, Wako (JP); Kazuaki Fukasaku, Wako (JP); Yasuhiro Ishida, Wako (JP); Yoshihiro Kudo, Funabashi (JP)

(73) Assignees: RIKEN, Wako (JP); NISSAN CHEMICAL CORPORATION, Tokyo (JP)

( * ) Notice: Subject to any disclaimer, the term of this patent is extended or adjusted under 35 U.S.C. 154(b) by 822 days.

(21) Appl. No.: 16/307,073

(22) PCT Filed: Jun. 19, 2017

(86) PCT No.: PCT/JP2017/022584
§ 371 (c)(1),
(2) Date: Dec. 4, 2018

(87) PCT Pub. No.: WO2017/221903
PCT Pub. Date: Dec. 28, 2017

(65) Prior Publication Data
US 2019/0146097 A1 May 16, 2019

(30) Foreign Application Priority Data
Jun. 22, 2016 (JP) .............................. JP2016-123551

(51) Int. Cl.
*G01T 1/00* (2006.01)
*G01T 1/04* (2006.01)
(Continued)

(52) U.S. Cl.
CPC .................. *G01T 1/04* (2013.01); *C08K 3/34* (2013.01); *C08K 5/20* (2013.01); *C08L 5/00* (2013.01);
(Continued)

(58) Field of Classification Search
CPC ....................................................... G01T 1/04
(Continued)

(56) References Cited

U.S. PATENT DOCUMENTS

2014/0080956 A1* 3/2014 Takeno .................. C08K 3/346
524/417

FOREIGN PATENT DOCUMENTS

| JP | 5590526 B2 | 9/2014 |
| JP | 2014-185969 A | 10/2014 |
| JP | 2014-209093 A | 11/2014 |

OTHER PUBLICATIONS

May 26, 2021 Office Action issued in Japanese Patent Application No. 2018-524094.
(Continued)

*Primary Examiner* — Christine T Mui
*Assistant Examiner* — Emily R. Berkeley
(74) *Attorney, Agent, or Firm* — Oliff PLC

(57) ABSTRACT

A gel forming composition for radiation dosimetry, and a high sensitivity and high safety radiation dosimeter using a gel formed from the composition. A gel forming composition for radiation dosimetry comprising a gelator and a compound of Formula (1):

(Continued)

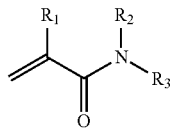

(1)

(wherein $R_1$ is a hydrogen atom, a halogen atom, an optionally substituted $C_{1-12}$ alkyl group, etc.; and $R_2$ and $R_3$ are each independently a hydrogen atom, an optionally substituted $C_{1-12}$ alkyl group, an optionally substituted monovalent $C_{6-12}$ aromatic group, or $R_2$ and $R_3$ form a 4- to 8-membered ring together with a carbon atom to which $R_2$ and $R_3$ are bonded, and the 4-to 8-membered ring may have 0 to 3 nitrogen atoms, oxygen atoms, or sulfur atoms as a ring atom, provided that $R_2$ and $R_3$ are not simultaneously a hydrogen atom).

13 Claims, 1 Drawing Sheet

(51) Int. Cl.
  *C08L 33/02*  (2006.01)
  *C08L 5/00*  (2006.01)
  *C08K 5/20*  (2006.01)
  *G01T 1/02*  (2006.01)
  *G01T 1/16*  (2006.01)
  *C08K 3/34*  (2006.01)
  *C08L 89/06*  (2006.01)

(52) U.S. Cl.
  CPC ............... *C08L 33/02* (2013.01); *C08L 89/06* (2013.01); *G01T 1/02* (2013.01); *G01T 1/16* (2013.01)

(58) Field of Classification Search
  USPC .......................................................... 436/58
  See application file for complete search history.

(56) References Cited

OTHER PUBLICATIONS

Sep. 12, 2017 International Search Report issued in International Patent Application No. PCT/JP2017/022584.
Sep. 12, 2017 Written Opinion of the International Searching Authority issued in International Patent Application No. PCT/JP2017/022584.
"Aquajoint Polymer Gel Dosimeter" in Proceedings of 4th 3D Gel Dosimeter Research Meeting, 2015.
Sakai et al., "Imaging the nano-structure of soft and wet materials with new type of DLS methods", Proceedings of SPIE, vol. 9802, 2016.
Maeyama et al., "Linear Energy Transfer Dependence of VIP Polymer Gel Dosimeters under Carbon Beam Irradiation", Radiation Chemistry, Oct. 31, 2014, No. 98, pp. 11-15.

* cited by examiner

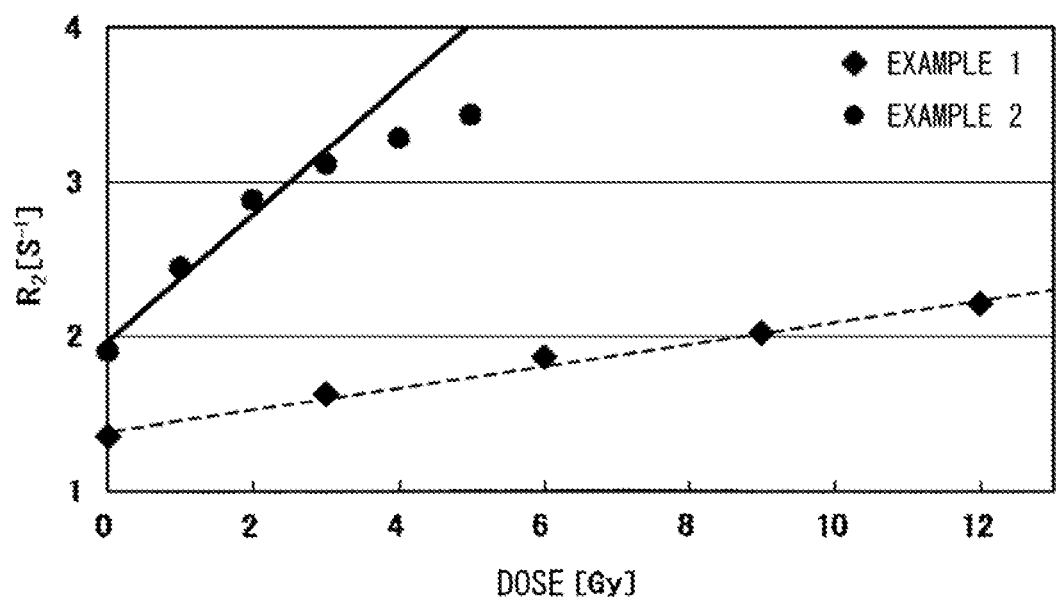

GEL FORMING COMPOSITION FOR RADIATION DOSIMETRY AND RADIATION DOSIMETER USING GEL THAT IS FORMED FROM SAID COMPOSITION

TECHNICAL FIELD

The present invention relates to a gel forming composition for radiation dosimetry and a radiation dosimeter using a gel formed from the composition. More specifically, the present invention relates to a gel forming composition for radiation dosimetry that is used in measurement of a three-dimensional dose distribution using clouding, and a radiation dosimeter using a gel formed from the composition.

BACKGROUND ART

As radiation therapy for cancer, high-precision therapy including stereotactic radiation therapy (SRT) in which pinpoint radiation therapy is performed, and intensity modulated particle therapy (IMPT) in which an irradiation field can be set three-dimensionally according to the profile of cancer by changing the dose intensity in the same irradiation field has been introduced. In these therapies, the integrated value (i.e., dose distribution) of amounts of microscopic energy transfer at each three-dimensional position of a target is adjusted with precision. Further, particle radiation therapy using a charged particle beam with high dose concentration, such as a proton beam and a heavy particle beam (a carbon beam, a neon beam, etc.), has been used. The particle radiation therapy has an advantage in which a tumor can be treated by controlling the position and dose of radiation with higher precision as compared with conventional X-ray therapy. The particle radiation therapy is required to properly emit energy of a particle beam to a target position of a lesion or the like in a living tissue, and to suppress the influence on a normal tissue near the target as much as possible. For these requirements, radial spreading of the particle beam and the position of Bragg peak of the particle beam are controlled according to a target position in an object to be irradiated.

In an actual radiation therapy plan, the dose distribution at each three-dimensional position in a living tissue is optimized. In a typical therapy plan, the dose distribution (radiation dose at each position) in a target tissue is modified according to a therapeutic purpose, and simultaneously, the influence of radiation on the normal tissue near the target tissue is suppressed. Thus, the influence on an organ at risk is also suppressed as much as possible. In order to make a dose distribution with such a complicated shape, beams may be precisely controlled and emitted in many directions. For this control, a filter and a collimator (a range shifter, a multileaf collimator, a bolus, etc.) that are adjusted according to the object to be irradiated are provided. In order to conduct a highly controlled radiation therapy, there is a need for high quality assurance and quality control (hereinafter abbreviated as "QA/QC") in an entire apparatus including a radiation irradiation apparatus, an accessory device, a filter, and a collimator, and an irradiation process by the apparatuses.

In order to achieve such therapy plans and QA/QC for the apparatuses, there is a need for a technology capable of properly integrating amounts of energy transfer of a plurality of ionizing radiations that are various acceleration energies incident in various directions for actual measurement. When integration of the amounts of energy transfer can lead to precise measurement of dose at each position, a three-dimensional distribution of amounts of energy transfer (dose distribution), which supports the QA/QC, can be measured. For the aforementioned measurement, a one- or two-dimensional dosimeter such as an ionization chamber dosimeter, a semiconductor detector, and a film have been conventionally used. These dosimeters actually measure the aforementioned dose distribution along a one- or two-dimensional coordinate of a region where a particle beam is to be set to the target position. In addition to these dosimeters, attention has been recently paid to a gel dosimeter in which a three-dimensional dose distribution can be measured by a gel using the measurement principle of a chemical dosimeter. The use of the gel dosimeter has an advantage in which the amount of energy transfer by radiation at each position of water, which is a material that can be regarded as a material equivalent to a living body, can be accurately measured, that is, the influence of radiation on a substance equivalent to the living body or a substance equivalent to water can be measured. The gel dosimeter can be used as a solid phantom to obtain a three-dimensional dose distribution.

As a gel dosimeter capable of measuring a three-dimensional dose distribution, for example, a Fricke gel dosimeters (Patent Document 1) and a polymer gel dosimeter (Patent Documents 2 and 3 and Non-Patent Document 1) have been reported. The Fricke gel dosimeter is a gel containing a solution (aqueous solution containing ferrous sulfate) of a Fricke dosimeter that is known as a liquid chemical dosimeter. In the Fricke gel dosimeter, an increase of an oxidation reaction (coloration) of divalent iron to trivalent iron due to radiation irradiation in proportion to an absorbed dose is used. On the other hand, the polymer gel dosimeter is a gel in which a monomer is dispersed. Under irradiation of the polymer gel dosimeter with radiation, a polymer is produced in proportion to a dose. When the amount of the polymer produced (degree of clouding) is determined, the dose can be estimated. The produced polymer is less likely to be diffused in the gel, and clouding is stable with time. The produced polymer appears to be a clouded portion floating in a transparent gel. Therefore, the produced polymer has visually excellent characteristics.

PRIOR ART DOCUMENTS

Patent Documents

Patent Document 1: Japanese Patent Application Publication No. 2014-209093 (JP 2014-209093 A)
Patent Document 2: Japanese Patent No. 5590526
Patent Document 3: Japanese Patent Application Publication No. 2014-185969 (JP 2014-185969 A)

Non-Patent Document

Non-Patent Document 1: "AQUAJOINT Polymer Gel Dosimeter" in Proceedings of 4th 3D Gel Dosimeter Research Meeting (2015)

SUMMARY OF THE INVENTION

Problem to be Solved by the Invention

In the conventional polymer gel dosimeter, a water-soluble polymerization monomer such as vinylamide, methacrylic acid, and acrylamide is used. The conventional polymer gel dosimeter has low dose sensitivity to radiation irradiation, and a problem in terms of safety of polymerization monomer. Therefore, a polymer gel dosimeter having higher sensitivity and high safety is required.

Means for Solving the Problems

The present inventors have intensively studied a polymer gel dosimeter having high sensitivity and high safety. As a result, the inventors have found that a polymer gel dosimeter using a gel formed from a composition containing a novel acrylamide derivative has excellent irradiation sensitivity. Thus, the present invention has been completed.

Specifically, a first aspect of the present invention relates to a gel forming composition for radiation dosimetry comprising a gelator and a compound of Formula (1):

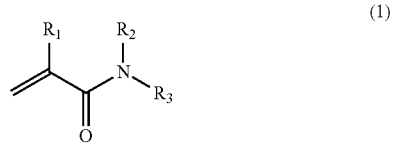

(1)

(wherein $R_1$ is a hydrogen atom, a halogen atom, an optionally substituted $C_{1-12}$ alkyl group, an optionally substituted $C_{1-12}$ alkyloxy group, an optionally substituted $C_{1-12}$ alkylthio group, an optionally substituted monovalent $C_{5-12}$ aromatic group, or a monovalent $C_{3-12}$ heteroaromatic group having at least one of a nitrogen atom, an oxygen atom, or a sulfur atom as a ring atom; and $R_2$ and $R_3$ are each independently a hydrogen atom, an optionally substituted $C_{1-12}$ alkyl group, an optionally substituted monovalent $C_{5-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring may have 0 to 3 nitrogen atoms, oxygen atoms, or sulfur atoms as a ring atom, provided that $R_2$ and $R_3$ are not simultaneously a hydrogen atom).

A second aspect of the present invention relates to the gel forming composition for radiation dosimetry according to the first aspect, wherein in Formula (1), $R_2$ and $R_3$ are each independently an optionally substituted $C_{1-12}$ alkyl group, an optionally substituted monovalent $C_{6-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring may have 0 to 3 nitrogen atoms, oxygen atoms, or sulfur atoms as a ring atom.

A third aspect of the present invention relates to the gel forming composition for radiation dosimetry according to the first or second aspect, wherein the gelator is one or two or more selected from the group consisting of gelatin, agarose, xanthan gum, carrageenan, gellan gum, chitosan, and alginic acid.

A fourth aspect of the present invention relates to the gel forming composition for radiation dosimetry according to the first or second aspect, wherein the gelator contains a water-soluble organic polymer (A) having an organic acid structure, an organic acid salt structure, or an organic acid anion structure, a silicate (B), and a dispersant (C) for the silicate.

A fifth aspect of the present invention relates to the gel forming composition for radiation dosimetry according to the fourth aspect, wherein the water-soluble organic polymer (A) is a fully or partially neutralized polyacrylate having a weight average molecular weight of 1,000,000 to 10,000,000.

A sixth aspect of the present invention relates to the gel forming composition for radiation dosimetry according to the fourth or fifth aspect, wherein the silicate (B) is one or two or more water-swellable silicate particles selected from the group consisting of smectite, bentonite, vermiculite, and mica.

A seventh aspect of the present invention relates to the gel forming composition for radiation dosimetry according to any one of the fourth to sixth aspects, wherein the dispersant (C) is one or two or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate-sodium maleate copolymer, an ammonium acrylate-ammonium maleate copolymer, sodium hydroxide, hydroxylamine, sodium carbonate, sodium silicate, polyethylene glycol, polypropylene glycol, sodium humate, and sodium ligninsulfonate.

An eighth aspect of the present invention relates to the gel forming composition for radiation dosimetry according to any one of the first to seventh aspects, further comprising a crosslinker.

A ninth aspect of the present invention relates to the gel forming composition for radiation dosimetry according to any one of the first to eighth aspects, further comprising a deoxidizing agent.

A tenth aspect of the present invention relates to a radiation gel dosimeter comprising a gel for radiation dosimetry formed from the gel forming composition for radiation dosimetry according to any one of the first to ninth aspects as a material for measuring a radiation dose.

An eleventh aspect of the present invention relates to a method for producing a gel forming composition for radiation dosimetry comprising the step of mixing the gelator and the compound of Formula (1) that are each specified by any one of the first to seventh aspects.

A twelfth aspect of the present invention relates to a method for producing a gel forming composition for radiation dosimetry comprising the step of mixing the gelator and the compound of Formula (I) that are each specified by any one of the first to seventh aspects, a crosslinker, and a deoxidizing agent.

A thirteenth aspect of the present invention relates to a method for measuring a radiation dose using the radiation gel dosimeter according to the tenth aspect.

Effects of the Invention

A polymer gel dosimeter using a gel formed from a gel forming composition for radiation dosimetry of the present invention has excellent irradiation sensitivity as compared with a conventional polymer gel dosimeter using methacrylic acid or acrylamide that has been widely used.

The gel formed from the gel forming composition for radiation dosimetry of the present invention, in particular, a gel formed from a composition including a gelator containing a water-soluble organic polymer (A), a silicate (B), and a dispersant (C) for the silicate can be produced simply by mixing at room temperature without heating. Therefore, the gel forming composition for radiation dosimetry of the present invention can provide a gel having a constant quality, and the gel formed from the composition can be used in the form of an injectable gel as a material for measuring a radiation dose in a radiation dosimeter.

Further, the gel formed from the gel forming composition for radiation dosimetry of the present invention, in particular, the gel formed from the composition including the gelator containing the water-soluble organic polymer (A), the silicate (B), and the dispersant (C) for the silicate has sufficient strength. For example, the gel typically has a hardness ("elastic modulus") or strength ("breaking stress") sufficient to maintain the gel shape without a support such as a container, that is, has a self-supporting property. Therefore, a gel for radiation dosimetry of the present invention can be used in preparation of a flexible gel dosimeter using not only glass or plastic containers but also a plastic wrap having low oxygen permeability.

BRIEF DESCRIPTION OF THE DRAWINGS

FIG. 1 is a graph showing results of irradiation experiment of a radiation dosimeter in Example 3.

MODES FOR CARRYING OUT THE INVENTION

[Gel Forming Composition for Radiation Dosimetry]

Examples of a component for the gel forming composition for radiation dosimetry of the present invention include a gelator and a compound [compound of Formula (1) described above] having an acrylamide structure that is a water-soluble polymerization monomer. In addition to the components, another component may be optionally contained, if necessary, without impairing the desired effects of the present invention.

<Gelator>

Examples of the gelator include natural polymers derived from a plant and an animal. Specific examples thereof include gelatin, agarose, xanthan gum, carrageenan, gellan gum, chitosan, alginic acid, or a salt thereof. In the present invention, two or more of the gelators may be used in combination.

The content of the natural polymer described above is 0.01% by mass to 30% by mass, and preferably 0.05% by mas to 20% by mass, relative to 100% by mass of gel forming composition for radiation dosimetry In the present invention, as the gelator, a gelator containing a water-soluble organic polymer (A) having an organic acid structure, an organic acid salt structure, or an organic acid anion structure, a silicate (B), and a dispersant (C) for the silicate can be used.

»Component (A): Water-Soluble Organic Polymer Having Organic Acid Structure, Organic Acid Salt Structure, or Organic Acid Anion Structure»

The water-soluble organic polymer (A) having an organic acid structure, an organic acid salt structure, or an organic acid anion structure is an organic polymer that has a plurality of organic acid groups such as carboxy group, sulfonyl group, and phosphonyl group, or a salt or anion structure of the organic acid groups as a side chain of the organic polymer and is freely dissolved in water.

Examples of such a water-soluble organic polymer (A) include a water-soluble organic polymer having carboxy group, such as a salt of poly(meth)acrylic acid, a salt of carboxyvinyl polymer, and a salt of carboxymethyl cellulose; a water-soluble organic polymer having sulfonyl group, such as a salt of polystyrenesulfonic acid; and a water-soluble organic polymer having phosphonyl group, such as a salt of polyvinylphosphonic acid. A salt of polyacrylic acid is preferable.

(Meth)acrylic acid used herein refers to both acrylic acid and methacrylic acid.

Examples of the water-soluble organic polymer having a salt structure of the organic acid groups include sodium, ammonium, potassium, and lithium salts of the aforementioned organic acid group.

Examples of the water-soluble organic polymer having an anion structure of the organic acid groups include a water-soluble organic polymer having a structure in which a cation is dissociated from the organic acid group or the salt of the organic acid.

It is preferable that the water-soluble organic polymer (A) have a linear structure that does not have a branched or chemically crosslinked structure. A fully neutralized product in which all the organic acid structures are a salt structure or a partially neutralized product in which the organic acid structure and the organic acid salt structure are mixed may be used.

The weight average molecular weight of the water-soluble organic polymer (A) is determined in terms of polyethylene glycol by gel permeation chromatography (GPC), and is preferably 1,000,000 or more and 10,000,000 or less, and more preferably 2,000,000 or more and 7,500,000 or less.

The water-soluble organic polymer (A) is preferably a fully or partially neutralized polyacrylate, more preferably a fully or partially neutralized linear polyacrylate, and particularly preferably a fully or partially neutralized linear sodium polyacrylate having a weight average molecular weight of 2,000,000 or more and 7,500,000 or less. The degree of neutralization of partial neutralization is 10% to 90%, and preferably 30% to 80%.

The content of the water-soluble organic polymer (A) is 0.01% by mass to 20% by mass, and preferably 0.05% by mass to 10% by mass, relative to 100% by mass of the gel forming composition for radiation dosimetry.

»Component (B): Silicate»

Examples of the silicate (B) include water-swellable silicate particles such as smectite, bentonite, vermiculite, and mica. A silicate that forms a colloid with water or a water-containing liquid as a dispersion medium is preferable. Smectite refers collectively to clay minerals having swelling properties, such as montmorillonite, beidellite, hectorite, saponite, and stevensite.

Examples of shapes of primary particles of the silicate particles include a disk shape, a plate shape, a spherical shape, a particle shape, a cubic shape, a needle shape, a rod shape, and an amorphous shape. For example, disk- or plate-shaped silicate particles having a diameter of 5 nm to 1,000 nm is preferable. For example, LAPONITE XLG® exemplified below has a disk shape having a diameter of 20 nm to 100 nm.

Preferable specific examples of the silicate include a layered silicate. Examples of those easily available as commercial products include LAPONITE XLG® (synthetic hectorite), XLS (synthetic hectorite, containing sodium pyrophosphate as a dispersant), XL21 (sodium magnesium fluorosilicate), RD (synthetic hectorite), RDS (synthetic hectorite, containing an inorganic polyphosphate as a dispersant), and S482 (synthetic hectorite, containing a dispersant) available from Rockwood Additives Ltd.; LUCENTITE SWN (synthetic smectite) and SWF (synthetic smectite), MICROMICA (synthetic mica), and SOMASIF (synthetic mica) available from Co-op Chemical Co., Ltd.; Kunipia (montmorillonite) and Sumecton SA (synthetic saponite) available from Kunimine Industries Co., Ltd.; and BENGEL (purified product of natural bentonite) available from Hojun Co., Ltd.

The content of the silicate (B) is 0.01% by mass to 20% by mass, and preferably 0.05% by mass to 10% by mass, relative to 100% by mass of the gel forming composition for radiation dosimetry.

»Component (C): Dispersant for Silicate«

As the dispersant (C) for the silicate, a dispersant or a deflocculant that is used to improve the dispersibility of the silicate or delaminate the layered silicate can be used. For example, a phosphate-based dispersant, a carboxylate-based dispersant, a substance that acts as an alkali, or an organic deflocculant can be used.

Examples of the phosphate-based dispersant include sodium orthophosphate, sodium pyrophosphate, sodium tripolyphosphate, sodium tetraphosphate, sodium hexametaphosphate, sodium polyphosphate, and sodium etidronate. Examples of the carboxylate-based dispersant include sodium poly(meth)acrylate, ammonium poly(meth)acrylate, a sodium acrylate-sodium maleate copolymer, and an ammonium acrylate-ammonium maleate copolymer. Examples of the substance that acts as an alkali include sodium hydroxide and hydroxylamine. Examples of a substance that reacts with a polyvalent cation to form an insoluble salt or a complex salt include sodium carbonate and sodium silicate. Examples of the organic deflocculant include polyethylene glycol, polypropylene glycol, sodium humate, lignin, and sodium sulfonate. Sodium pyrophosphate and sodium etidronate as the phosphate-based dispersant, sodium poly(meth)acrylate as the carboxylate-based dispersant, and polyethylene glycol (PEG900, etc.) as the organic deflocculant are preferable.

Among these, the carboxylate-based dispersant is preferable, sodium poly(meth)acrylate is more preferable, and lowly-polymerized sodium polyacrylate having a weight average molecular weight of 1,000 or more and 20,000 or less is particularly preferable.

The lowly-polymerized sodium polyacrylate is known to act as a dispersant by a mechanism in which the low-polymerization sodium polyacrylate interacts with the silicate particles to produce carboxy anion-derived negative charges on a surface of the particles, and the silicate is dispersed due to the charge repulsion.

The content of the dispersant (C) is 0.01% by mass to 20% by mass, and preferably 0.05% by mass to 10% by mass, relative to 100% by mass of the gel forming composition for radiation dosimetry.

In the present invention, when a silicate containing a dispersant is used, the dispersant may be further added or may not be added.

»Component (D): Compound Having Divalent or Higher Positive Charge«

To the gel forming composition, a compound (D) having a divalent or higher positive charge may be added, if necessary.

Examples of the compound (D) having a divalent or higher positive charge include one or two or more compounds selected from the group consisting of a compound containing a group II element, a compound containing a transition metal element, a compound containing an amphoteric element, and a compound containing polyamines.

Examples of the compound containing a group II element include compounds of beryllium, magnesium, and calcium. Examples of the compound containing a transition metal element include compounds of scandium, titanium, vanadium, chromium, manganese, iron, cobalt, nickel, copper, zirconium, molybdenum, ruthenium, rhodium, and palladium. Examples of the compound containing an amphoteric element include compounds of zinc, cadmium, mercury, aluminum, gallium, indium, thallium, tin, and lead. Examples of the compound containing polyamines include compounds of ethylenediamine, phenylenediamine, hydrazine, putrescine, cadaverine, spermidine, and spermine.

These compounds may be each an oxide or hydroxide having a divalent or higher positive charge, or a salt thereof. Further, the compound containing polyamines may be in free form.

Examples of an acid constituting the salt include sulfuric acid, hydrochloric acid, hydrobromic acid, hydrofluoric acid, trifluoroacetic acid, acetic acid, phosphoric acid, diphosphoric acid, hexametaphosphoric acid, polyphosphoric acid, silicic acid, aluminic acid, trifluoromethanesulfonic acid, methanesulfonic acid, and p-toluenesulfonic acid.

The compound (D) having a divalent or higher positive charge is preferably hydrochloride, sulfate, diphosphate, silicate, or aluminate of magnesium, calcium, or aluminum, and more preferably magnesium chloride, calcium chloride, magnesium sulfate, aluminum sulfate, calcium diphosphate, or magnesium aluminosilicate.

When the gel forming composition for radiation dosimetry contains the component (D), the content of the compound (D) is 0.01% by mass to 50% by mass, and preferably 0.05% by mass to 10% by mass, relative to 100% by mass of the gel forming composition for radiation dosimetry.

Preferable examples of combination of the water-soluble organic polymer (A), the silicate (B), and the dispersant (C) for the silicate include combinations of 0.05% by mass to 10% by mass of fully or partially neutralized linear sodium polyacrylate having a weight average molecular weight of 2,000,000 or more and 7,500,000 or less as the component (A), 0.05% by mass to 10% by mass of water-swellable smectite or saponite as the component (B), and 0.05% by mass to 10% by mass of sodium pyrophosphate or 0.05% by mass to 10% by mass of sodium polyacrylate having a weight average molecular weight of 1,000 or more and 20,000 or less as the component (C) in 100% by mass of the gel forming composition for radiation dosimetry.

When the gel forming composition for radiation dosimetry of the present invention contains the component (D), preferable examples of combination of the water-soluble organic polymer (A), the silicate (B), the dispersant (C) for the silicate, and the compound (D) include combinations of 0.05% by mass to 10% by mass of fully or partially neutralized linear sodium polyacrylate having a weight average molecular weight of 2,000,000 or more and 7,500,000 or less as the component (A), 0.05% by mass to 10% by mass of water-swellable smectite or saponite as the component (B), 0.05% by mass to 10% by mass of sodium pyrophosphate or 0.05% by mass to 10% by mass of sodium polyacrylate having a weight average molecular weight of 1,000 or more and 20,000 or less as the component (C), and 0.05% by mass to 10% by mass of magnesium chloride, calcium chloride, or magnesium sulfate as the component (D) in 100% by mass of the gel forming composition for radiation dosimetry.

[Compound of Formula (1)]

The gel forming composition for radiation dosimetry of the present invention contains a compound of the following Formula (1) as a water-soluble polymerization monomer.

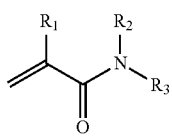

(1)

(wherein $R_1$ is a hydrogen atom, a halogen atom, an optionally substituted $C_{1-12}$ alkyl group, an optionally substituted $C_{1-12}$ alkyloxy group, an optionally substituted $C_{1-12}$ alkylthio group, an optionally substituted monovalent $C_{6-12}$ aromatic group, or a monovalent $C_{3-12}$ heteroaromatic group having at least one of a nitrogen atom, an oxygen atom, or a sulfur atom as a ring atom; and $R_2$ and $R_3$ are each independently a hydrogen atom, an optionally substituted $C_{1-12}$ alkyl group, an optionally substituted monovalent $C_{6-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring may have 0 to 3 nitrogen atoms, oxygen atoms, or sulfur atoms as a ring atom, provided that $R_2$ and $R_3$ are not simultaneously a hydrogen atom.)

Of the compound of Formula (1), a compound in which $R_2$ and $R_3$ are each independently an optionally substituted $C_{1-12}$ alkyl group, an optionally substituted monovalent $C_{6-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring may have 0 to 3 nitrogen atoms, oxygen atoms, or sulfur atoms as a ring atom, from the viewpoint of increasing the irradiation sensitivity of the polymer gel dosimeter is preferable.

Examples of the halogen atom of $R_1$ include a fluorine atom, a chlorine atom, a bromine atom, and an iodine atom.

A $C_{1-12}$ alkyl group of $R_1$ may be a linear, branched, or cyclic alkyl group.

Examples of the linear $C_{1-12}$ alkyl group include methyl group, ethyl group, n-propyl group, n-butyl group, n-pentyl group, n-hexyl group, n-heptyl group, n-octyl group, n-nonyl group, n-decyl group, n-undecyl group, and n-dodecyl group.

Examples of the branched $C_{1-12}$ alkyl group include i-propyl group, i-butyl group, s-butyl group, t-butyl group, 1-methyl-n-butyl group, 2-methyl-n-butyl group, 3-methyl-n-butyl group, 1,1-dimethyl-n-propyl group, 1,2-dimethyl-n-propyl group, 2,2-dimethyl-n-propyl group, 1-ethyl-n-propyl group, 1-methyl-n-pentyl group, 2-methyl-n-pentyl group, 3-methyl-n-pentyl group, 4-methyl-n-pentyl group, 1,1-dimethyl-n-butyl group, 1,2-dimethyl-n-butyl group, 1,3-dimethyl-n-butyl group, 2,2-dimethyl-n-butyl group, 2,3-dimethyl-n-butyl group, 3,3-dimethyl-n-butyl group, 1-ethyl-n-butyl group, 2-ethyl-n-butyl group, 1,1,2-trimethyl-n-propyl group, 1,2,2-trimethyl-n-propyl group, 1-ethyl-1-methyl-n-propyl group, 1-ethyl-2-methyl-n-propyl group, and a $C_{1-12}$ alkyl group that is branched at an optional position.

Examples of the cyclic $C_{1-12}$ alkyl group include monocyclic alkyl groups such as cyclopropyl group, cyclobutyl group, cyclopentyl group, cyclohexyl group, cycloheptyl group, and cyclooctyl group, and polycyclic alkyl groups such as norbornyl group and adamantyl group.

The $C_{1-12}$ alkyloxy group of $R_1$ may be a linear, branched, or cyclic alkyloxy group.

Examples of the linear $C_{1-12}$ alkyloxy group include, but are not particularly limited to, linear $C_{1-12}$ alkyl-O— group wherein the alkyl moiety has the aforementioned meaning. Specific examples thereof include methoxy group, ethoxy group, n-propoxy group, and n-butoxy group.

Examples of the branched and cyclic $C_{1-12}$ alkyloxy groups include, but are not particularly limited to, branched and cyclic $C_{1-12}$ alkyl-O— groups wherein the alkyl moiety has the aforementioned meaning similarly to the aforementioned description of "linear $C_{1-12}$ alkyloxy group."

The $C_{1-12}$ alkylthio group of $R_1$ may be a linear, branched, or cyclic alkylthio group.

Examples of the linear $C_{1-12}$ alkylthio group include, but are not particularly limited to, linear $C_{1-12}$ alkyl-S— group wherein the alkyl moiety has the aforementioned meaning. Specific examples thereof include methylthio group, ethylthio group, and n-propylthio group.

Examples of the branched and cyclic $C_{1-12}$ alkylthio groups include, but are not particularly limited to, branched and cyclic $C_{1-12}$ alkyl-S— groups wherein the alkyl moiety has the aforementioned meaning similarly to the aforementioned description of "linear $C_{1-12}$ alkylthio group."

The $C_{1-12}$ alkyl, alkyloxy, and alkylthio groups may be substituted. Examples of a substituent include, but are not particularly limited to, amino group, alkoxy group, hydroxy group, cyano group, hydroxycarbonyl group, alkoxycarbonyl group, and aminocarbonyl group.

Examples of the monovalent $C_{6-12}$ aromatic group of $R_1$ include phenyl group and naphthyl group.

The monovalent $C_{6-12}$ aromatic group may be substituted. Examples of a substituent include, but are not particularly limited to, a chlorine atom, a fluorine atom, alkyl group, hydroxy group, alkyloxy group, amino group, alkylamino group, carboxy group, alkoxycarbonyl group, aminocarbonyl group, alkylaminocarbonyl group, nitro group, and cyano group.

Examples of the monovalent $C_{3-12}$ heteroaromatic group having at least one of a nitrogen atom, an oxygen atom, or a sulfur atom as a ring atom of $R_1$ include pyrrolyl group, pyridyl group, quinolyl group, indolyl group, furyl group, benzofuranyl group, thienyl group, benzothienyl group, oxazolyl group, benzoxazolyl group, thiazolyl group, benzothiazolyl group, pyrazolyl group, imidazolyl group, pyrimidyl group, pyrazyl group, imidazo[1,2-a]pyridyl group, benzimidazolyl group, and quinoxalyl group.

In definitions of $R_2$ and $R_3$, "$R_2$ and $R_3$ form a 4- to 8-membered ring together with a carbon atom to which $R_2$ and $R_3$ are bonded, and the 4- to 8-membered ring may have 0 to 3 nitrogen atoms, oxygen atoms, or sulfur atoms as a ring atom" represents that $R_2$ and $R_3$ are bonded to each other and form a 4- to 8-membered ring together with a carbon atom to which $R_2$ and $R_3$ are bonded, and the 4- to 8-membered ring may further have 0 to 3 nitrogen atoms, oxygen atoms, or sulfur atoms as a ring atom.

Examples of such a ring include an azacyclobutane ring, a pyrrolidine ring, a piperidine ring, a hexamethyleneimine ring, a pyrazolidine ring, an imidazolidine ring, a piperazine ring, an oxazolidine ring, an isoxazolidine ring, a morpholine ring, a thiazolidine ring, an isothiazolidine ring, and a thiomorpholine ring.

Examples of the optionally substituted $C_{1-12}$ alkyl group, the optionally substituted monovalent $C_{6-12}$ aromatic group, and the monovalent $C_{3-12}$ heteroaromatic group having at least one of a nitrogen atom, an oxygen atom, or a sulfur atom as a ring atom, of $R_2$ and $R_3$ include those exemplified as examples of $R_1$.

Specific examples of the compound of Formula (1) described above include N-methylacrylamide, N-ethylacrylamide, N-n-propylacrylamide, N-n-butylacrylamide, N-i-propylacrylamide, N-cyclopropylacrylamide, N-methoxymethylacrylamide, N-hydroxymethylacrylamide, N-hydroxyethylacrylamide, N-phenylacrylamide, N-naphthylacrylamide, N,N-dimethylacrylamide, N,N-diethylacrylamide, N,N-di-n-propylacrylamide, N,N-di-n-butylacrylamide, N,N-di-i-propylacrylamide, N,N-di-i-butylacrylamide, N,N-di-s-butylacrylamide, N,N-diphenylacrylamide, N-methyl-N-ethylacrylamide, N-methyl-N-n-butylacrylamide, N-ethyl-N-methylacrylamide, N-ethyl-N-i-propylacrylamide, N-ethyl-N-n-butylacrylamide, N-ethyl-N-t-butylacrylamide, N-acryloylpyrrolidine, N-acryloylpiperidine, and 4-acryloylmorpholine.

The content of the component of Formula (1) is 1% by mass to 15% by mass, and preferably 2% by mass to 10% by mass, relative to 100% by mass of the gel forming composition for radiation dosimetry.

When the compound of Formula (1) is a secondary amide, it is preferable that the gelator used in the present invention be the gelator containing the water-soluble organic polymer (A) having an organic acid structure, an organic acid salt structure, or an organic acid anion structure, the silicate (B), and the dispersant (C) for the silicate.

On the other hand, when the compound of Formula (1) is a tertiary amide, it is preferable that the gelator used in the present invention be the natural polymer or the gelator containing the water-soluble organic polymer (A) having an organic acid structure, an organic acid salt structure, or an organic acid anion structure, the silicate (B), and the dispersant (C) for the silicate, and from the viewpoint of heat resistance of gel to be obtained, it is more preferable that the gelator be the gelator containing the water-soluble organic polymer (A) having an organic acid structure, an organic acid salt structure, or an organic acid anion structure, the silicate (B), and the dispersant (C) for the silicate.

<Crosslinker>

It is preferable that the gel forming composition for radiation dosimetry of the present invention form a polymer having a crosslinked structure to prevent the polymer produced after radiation irradiation from diffusing or moving in the gel. In order to produce the polymer having a crosslinked structure, it is preferable that the gel forming composition contain at least one monomer having two or more unsaturated bonds in the molecule as the crosslinker (hereinafter also referred to as a "polyfunctional monomer"). Examples of such a polyfunctional monomer include N,N'-methylenebisacrylamide, N,N'-diallylacrylamide, N,N'-diacryloylimide, triallylformal, 1,3,5-triacryloylhexahydro-1,3,5-triazine, diallylnaphthalene, ethylene glycol diacrylate, ethylene glycol dimethacrylate, various polyethylene glycol di(meth)acrylates, propylene glycol diacrylate, propylene glycol dimethacrylate, various polypropylene glycol di(meth)acrylates, 1,3-butylene glycol diacrylate, 1,3-butylene glycol dimethacrylate, 1,4-butylene glycol dimethacrylate, various polybutylene glycol di(meth)acrylates, glycerol dimethacrylate, neopentyl glycol dimethacrylate, trimethylolpropane triacrylate, trimethylolpropane trimethacrylate, tetramethylolmethane tetramethacrylate, and divinyl compounds such as divinylbenzene. Among these, N,N'-methylenebisacrylamide is preferable. Some of the aforementioned monomers are less likely to be dissolved in water. However, the monomers are not limited as long as they may be uniformly dispersed in the gel and the entire gel before radiation irradiation is transparent. In order to further enhance the uniform dispersibility, an organic solvent such as an alcohol may be added in an amount of 5% or less.

<Other Additive>

In order to promote a polymerization reaction due to radiation irradiation and to enhance radiation sensitivity, it is preferable that the gel forming composition for radiation dosimetry of the present invention contain a deoxidizing agent such as ascorbic acid and tetrakis(hydroxymethyl) phosphonium chloride (THPC), or a pH adjuster such as glucono-δ-lactone, perchioric acid, sulfuric acid, and a salt. In order to suppress polymerization of remaining monomer after radiation irradiation, the gel forming composition for radiation dosimetry of the present invention may also contain a free radical scavenger such as hydroquinone and phenylenediamine, or an ultraviolet absorber such as guaiazulene. Further, the gel forming composition for radiation dosimetry of the present invention may contain a colorant, if necessary.

Method for Producing Gel Forming Composition for Radiation Dosimeter

A method for producing gel forming composition for radiation dosimeter is not particularly limited. Examples thereof include a method in which the components (A) to (C) and the compound of Formula (1) are mixed at a predetermined ratio, and if desired, the component (D), the crosslinker, and the other additive are further added and mixed, to obtain a uniform solution, and a method in which among the aforementioned components, for example, at least a part of at least two of the components (A) to (C) are mixed to obtain a uniform solution, the rest is then added, and if desired, the component (D), the crosslinker, and the other additive are further added and mixed, to obtain a uniform solution.

[Radiation Dosimeter]

The gel for radiation dosimetry formed from the gel forming composition for radiation dosimetry of the present invention is suitable for a material for measuring a radiation dose. Therefore, the gel for radiation dosimetry can be placed in a container and used as a radiation gel dosimeter, for example, a phantom. The container is not particularly limited as long as it is non-responsive to MRI, transmits radiation, and has solvent resistance, air-tightness, and the like. It is preferable that a material for the container be glass, an acrylic resin, a polyester, or an ethylene-vinyl alcohol copolymer. When the container is transparent, a three-dimensional dose distribution can be measured by using not only MRI but also optical CT capable of three-dimensional measurement of degree of clouding. After the container is charged with the gel, the inside of the container may be replaced with a nitrogen gas or the like.

[Method for Measuring Radiation Dose]

A method for measuring a radiation dose using the radiation gel dosimeter is also a subject of the present invention.

The method for measuring a radiation dose is not particularly limited. For example, the method can be used in irradiation with a general-purpose X-ray irradiation apparatus. The method can also be used in irradiation under the assumption of an actual therapy using an irradiation apparatus that is used in high radiation therapy for cancer using radiation with high dose concentration, such as intensity modulated radio therapy (IMRT) and sterotactic radio therapy (SRT), or radiation with a charged particle beam such as a proton beam and a heavy particle beam (e.g., a carbon beam and a neon beam). In a method for analyzing the dose after irradiation, the absorbed dose is determined by a relaxation rate $R_2$-absorbed dose curve from a $R_2$ image obtained by imaging by an X-ray CT apparatus, an optical CT apparatus, an ultrasonic wave echo apparatus, or MRI, and the absorbed dose distribution of radiation gel dosimeter after irradiation is quantified.

For example, the radiation dose is determined according to a method of irradiation experiment for a radiation dosimeter described in Example 3.

EXAMPLES

The present invention will be specifically described with reference to

Examples, but the present invention is not limited to these Examples.

Production Example 1

Production of Aqueous Silicate Dispersion 6 parts of LAPONITE XLG® (available from Rockwood Additives Ltd.), 1.7 parts of a 35% aqueous solution of lowly-polymerized sodium polyacrylate (weight average molecular weight: 15,000; available from Sigma-Aldrich Co. LLC.), and 92.3 parts of water were mixed, and the mixture was stirred at 25° C. until a homogeneous aqueous dispersion was produced. As a result, a target product was obtained.

Production Example 2

Production of Aqueous Solution of Highly-Polymerized Sodium Polyacrylate 2 parts of highly-polymerized sodium polyacrylate (available from Wako Pure Chemical Industries, Ltd.; degree of polymerization: 22,000 to 70,000, weight average molecular weight: 2,068,000 to 6,580,000 (calculated as a unit molecular weight of 94 (—$CH_2$—CHCOONa—)), fully neutralized) and 98 parts of water were mixed, and the mixture was stirred at 25° C. until a homogeneous aqueous solution was produced. As a result, a target product was obtained.

Example 1

Production of Polymer Gel Dosimeter Using Gelatin as Gelator

To 89 g of water, 3 g of N,N'-methylenebisacrylamide (available from Wako Pure Chemical Industries, Ltd.), 5 g of gelatin (available from Sigma Aldrich Co. LLC.), 3 g of N,N-dimethylacrylamide (available from Tokyo Chemical Industry Co., Ltd.), and 0.12 g of 80% aqueous solution of tetrakis(hydroxymethyl)phosphonium chloride (available from Tokyo Chemical Industry Co., Ltd.) were added, and the mixture was heated at 45° C. to 50° C. and stirred until the mixture was homogeneous. A 25 mL colorimetric tube was charged with the resulting mixture, and then cooled with iced water for 3 hours while the colorimetric tube was allowed to stand. The colorimeter tube was allowed to stand at room temperature for 24 hours, to obtain a target product for an irradiation experiment.

Example 2

Production of Polymer Gel Dosimeter Using Water-Soluble Organic Polymer, Silicate, and Dispersant for the Silicate as Gelator 3 g of N,N'-methylenebisacrylamide (available from Wako Pure Chemical Industries, Ltd.) was added to 74 g of water, and the mixture was stirred with heating at 40° C. to 45° C. 10 g of the highly-polymerized sodium polyacrylate aqueous solution produced in Production Example 2, 3 g of N,N-dimethylacrylamide (available from Tokyo Chemical Industry Co., Ltd.), and 1.2 g of 80% aqueous solution of tetrakis(hydroxymethyl)phosphonium chloride (available from Tokyo Chemical Industry Co., Ltd.) were added, and the mixture was stirred until the mixture was homogeneous. 10 g of the aqueous silicate dispersion produced in Production Example 1 was added, and the mixture was stirred for 1 minute. A 25-mL colorimetric tube was charged with the resulting mixture, and then allowed to stand at room temperature for 24 hours, to obtain a target product for an irradiation experiment.

Example 3

Irradiation Experiment for Radiation Dosimeter

The samples of polymer gel dosimeters obtained in Examples 1 and 2 were each irradiated with a X ray (250 kV, 4 mA) using Radioflex 250CG (Rigaku Denki Co., Ltd.) in RIKEN. Specifically, the polymer gel dosimeter of Example 1 was irradiated at a dose of 3, 6, 9, or 12 Gy and a dose rate of 1 Gy/minute, and the polymer gel dosimeter of Example 2 was irradiated at a dose of 1, 2, 3, 4, or 5 Gy and a dose rate of 1 Gy/minute. The samples after irradiation were each analyzed by MRI measurement using 1.5 T MRI (Intera Achieva Nova Dual; manufactured by Philips). Mixed turbo spin echo pulse sequence was applied to generate a pulsed magnetic field for the analysis, and a $T_2$ relaxation time for each of the samples was obtained to calculate a relaxation rate $R_2$ (i.e., $1/T_2$). As confirmed from the result shown in FIG. 1, $R_2$ increases in proportion to the dose. The ratio of increase in $R_2$ of the polymer gel dosimeter of Example 1 to the dose corresponding to the irradiation sensitivity was 0.07 ($Gy^{-1}s^{-1}$), and that of the polymer gel dosimeter of Example 2 was 0.41 ($Gy^{-1}s^{-1}$).

INDUSTRIAL APPLICABILITY

The gel forming composition for radiation dosimetry of the present invention can be easily produced using an industrially available raw material. The polymer gel dosimeter using the gel formed from the composition has excellent irradiation sensitivity and linearity, and thus, can be applied to a variety of radiation therapy.

The invention claimed is:

1. A gel forming composition for radiation dosimetry comprising a gelator and a compound of Formula (1):

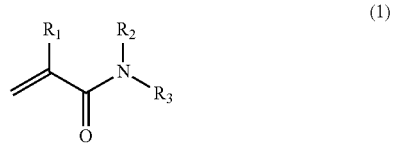

(1)

wherein $R_1$ is a hydrogen atom, a halogen atom, an optionally substituted $C_{1-12}$ alkyl group, an optionally substituted $C_{1-12}$ alkyloxy group, an optionally substituted $C_{1-12}$ alkylthio group, an optionally substituted monovalent $C_{6-12}$ aromatic group, or a monovalent $C_{3-12}$ heteroaromatic group having at least one of a nitrogen atom, an oxygen atom, or a sulfur atom as a ring atom; and $R_2$ and $R_3$ are each independently a hydrogen atom, an optionally substituted $C_{1-12}$ alkyl group, an optionally substituted monovalent $C_{6-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring optionally has 0 to 3 nitrogen atoms, oxygen atoms, or sulfur atoms as a ring atom, provided that $R_2$ and $R_3$ are not simultaneously a hydrogen atom, and wherein the gelator contains a water-soluble organic polymer (A) having an organic acid structure, an organic acid salt structure, or an organic acid anion structure, a silicate (B), and a dispersant (C) for the silicate.

2. The gel forming composition for radiation dosimetry according to claim 1, wherein in Formula (1), $R_2$ and $R_3$ are each independently an optionally substituted $C_{1-12}$ alkyl group, an optionally substituted monovalent $C_{6-12}$ aromatic group, or a monovalent $C_{3-12}$ heteroaromatic group having at least one of a nitrogen atom, an oxygen atom, or a sulfur atom as a ring atom, or $R_2$ and $R_3$ form a 4- to 8-membered ring together with a carbon atom to which $R_2$ and $R_3$ are bonded, and the 4- to 8-membered ring optionally has 0 to 3 nitrogen atoms, oxygen atoms, or sulfur atoms as a ring atom.

3. The gel forming composition for radiation dosimetry according to claim 1, wherein the gelator is one or two or more selected from the group consisting of agarose, xanthan gum, carrageenan, gellan gum, chitosan, and alginic acid.

4. The gel forming composition for radiation dosimetry according to claim 1, wherein the water-soluble organic polymer (A) is a fully or partially neutralized polyacrylate having a weight average molecular weight of 1,000,000 to 10,000,000.

5. The gel forming composition for radiation dosimetry according to claim 1, wherein the silicate (B) is one or two or more water-swellable silicate particles selected from the group consisting of smectite, bentonite, vermiculite, and mica.

6. The gel forming composition for radiation dosimetry according to claim 1, wherein the dispersant (C) is one or two or more selected from the group consisting of sodium orthophosphate, sodium pyrophosphate, sodium tripolyphosphate, sodium tetraphosphate, sodium hexametaphosphate, sodium polyphosphate, sodium etidronate, sodium poly(meth)acrylate, ammonium poly(meth)acrylate, a sodium acrylate-sodium maleate copolymer, an ammonium acrylate-ammonium maleate copolymer, sodium hydroxide, hydroxylamine, sodium carbonate, sodium silicate, polyethylene glycol, polypropylene glycol, sodium humate, and sodium ligninsulfonate.

7. The gel forming composition for radiation dosimetry according to claim 6, further comprising a crosslinker.

8. The gel forming composition for radiation dosimetry according to claim 1, further comprising a deoxidizing agent.

9. The gel forming composition for radiation dosimetry according to claim 1, wherein the gelator additionally contains a compound (D) having a divalent or higher positive charge.

10. The gel forming composition for radiation dosimetry according to claim 9, wherein the compound (D) is at least one compound selected from the group consisting of a compound containing a group II element, a compound containing a transition metal element, a compound containing an amphoteric element, and a polyamine.

11. The gel forming composition for radiation dosimetry according to claim 9, wherein the compound (D) is a hydrochloride, sulfate, diphosphate, silicate, or aluminate of magnesium, calcium, or aluminum.

12. The gel forming composition for radiation dosimetry according to claim 11, wherein the compound (D) is, magnesium chloride, calcium chloride, magnesium sulfate, aluminum sulfate, calcium diphosphate, or magnesium aluminosilicate.

13. The gel forming composition for radiation dosimetry according to claim 1, wherein the compound of Formula (1) is not N,N-dimethylacrylamide.

* * * * *